US009578565B1

(12) United States Patent
Manchanda et al.

(10) Patent No.: US 9,578,565 B1
(45) Date of Patent: Feb. 21, 2017

(54) DYNAMIC HYSTERESIS OFFSET MANIPULATION FOR WIRELESS COMMUNICATION DEVICE HANDOVERS

(71) Applicant: Sprint Communications Company L.P., Overland Park, KS (US)

(72) Inventors: Nitesh Manchanda, Overland Park, KS (US); Jasinder Pal Singh, Olathe, KS (US); Siddharth Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/885,424

(22) Filed: Oct. 16, 2015

(51) Int. Cl.
| | |
|---|---|
| *H04W 36/00* | (2009.01) |
| *H04W 36/04* | (2009.01) |
| *H04W 16/32* | (2009.01) |
| *H04W 36/30* | (2009.01) |
| H04W 84/04 | (2009.01) |
| H04W 88/08 | (2009.01) |

(52) U.S. Cl.
CPC .............. *H04W 36/04* (2013.01); *H04W 16/32* (2013.01); *H04W 36/0055* (2013.01); *H04W 36/30* (2013.01); H04W 84/042 (2013.01); H04W 88/08 (2013.01)

(58) Field of Classification Search
CPC ............. H04W 36/0055; H04W 36/14; H04W 36/0011; H04W 36/26; H04W 36/00; H04W 36/0083; H04W 4/021; H04W 4/027

USPC .......................... 455/436–444; 370/321–334
See application file for complete search history.

(56) References Cited

U.S. PATENT DOCUMENTS

| | | | |
|---|---|---|---|
| 5,701,585 A | 12/1997 | Kallin et al. | |
| 6,434,389 B1 | 8/2002 | Meskanen et al. | |
| 8,326,303 B2 | 12/2012 | Kumar et al. | |
| 8,532,660 B2 | 9/2013 | Zou et al. | |
| 8,588,773 B2 * | 11/2013 | Deshpande | H04J 11/0093 370/328 |
| 8,948,767 B2 | 2/2015 | Sridhar et al. | |
| 2009/0093252 A1 | 4/2009 | Czaja et al. | |
| 2010/0075677 A1 * | 3/2010 | Wang | H04W 36/0055 455/436 |
| 2012/0282931 A1 | 11/2012 | Giustina et al. | |

FOREIGN PATENT DOCUMENTS

CN 103313320 9/2013

* cited by examiner

*Primary Examiner* — Ronald Eisner

(57) ABSTRACT

A source macro base station exchanges user data with a wireless communication device using an enhanced Radio Frequency (RF) service and receives RF measurement data from the wireless communication device. The RF measurement data is processed using a hysteresis parameter to detect a pico handover event to a target pico base station, and in response, determine if the target pico base station supports the enhanced RF service, and if the target pico base station does not support the enhanced RF service, the hysteresis parameter is modified to inhibit a pico handover to the target pico base station. The RF measurement data is processed to detect a macro handover event to a target macro base station, and in response, the hysteresis parameter is modified to drive a macro handover to the target macro base station if the target macro base station supports the enhanced RF service.

20 Claims, 5 Drawing Sheets

DYNAMIC HYSTERESIS OFFSET MANIPULATION FOR WIRELESS COMMUNICATION DEVICE HANDOVERS

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices typically utilize "forward link" communication channels to receive voice and/or data transmitted from the wireless access node, and "reverse link" communication channels to transmit information up to the node. In fourth generation (4G) long term evolution (LTE) communication systems, a wireless communication device is referred to as user equipment (UE), while a wireless access node is typically called an enhanced node B (eNodeB).

In response to increased demand for high-speed wireless communication services, wireless communication service providers may deploy heterogeneous networks to improve system capacity and enhance network coverage. A heterogeneous network contains wireless access nodes that have different characteristics, such as transmission power and radio frequency (RF) coverage areas. For example, a wireless coverage area provided by a macrocell base station may be supplemented by many smaller, low-power nodes, such as femtocells, picocell base stations, and relay nodes. However, other advanced communication features, such as carrier aggregation, beamforming, and Voice over LTE (VoLTE), may have varying degrees of support among the different base stations in a heterogeneous network.

Overview

A method of operating a source macro base station to perform a macro handover of a wireless communication device is disclosed. The method comprises exchanging user data with the wireless communication device using an enhanced Radio Frequency (RF) service and receiving RF measurement data from the wireless communication device. The method further comprises processing the RF measurement data using a hysteresis parameter to detect a pico handover event to a target pico base station, and in response, determining if the target pico base station supports the enhanced RF service, and if the target pico base station does not support the enhanced RF service, then modifying the hysteresis parameter to inhibit a pico handover to the target pico base station. The method further comprises processing the RF measurement data to detect a macro handover event to a target macro base station, and in response, determining if the target macro base station supports the enhanced RF service, and if the target macro base station supports the enhanced RF service, then modifying the hysteresis parameter to drive the macro handover to the target macro base station.

A source macro base station to perform a macro handover of a wireless communication device comprises a wireless communication transceiver and a processing system. The wireless communication transceiver is configured to exchange user data with the wireless communication device using an enhanced Radio Frequency (RF) service and receive RF measurement data from the wireless communication device. The processing system is configured to process the RF measurement data using a hysteresis parameter to detect a pico handover event to a target pico base station, and in response, determine if the target pico base station supports the enhanced RF service, and if the target pico base station does not support the enhanced RF service, then modify the hysteresis parameter to inhibit a pico handover to the target pico base station. The processing system is further configured to process the RF measurement data to detect a macro handover event to a target macro base station, and in response, determine if the target macro base station supports the enhanced RF service, and if the target macro base station supports the enhanced RF service, then modify the hysteresis parameter to drive the macro handover to the target macro base station.

A computer apparatus to operate a source macro base station to perform a macro handover of a wireless communication device comprises software instructions and at least one non-transitory computer-readable storage medium storing the software instructions. The software instructions are configured, when executed by the source macro base station, to direct the source macro base station to exchange user data with the wireless communication device using an enhanced Radio Frequency (RF) service and receive RF measurement data from the wireless communication device. The software instructions are further configured to direct the source macro base station to process the RF measurement data using a hysteresis parameter to detect a pico handover event to a target pico base station, and in response, determine if the target pico base station supports the enhanced RF service, and if the target pico base station does not support the enhanced RF service, then modify the hysteresis parameter to inhibit a pico handover to the target pico base station. The software instructions are further configured to direct the source macro base station to process the RF measurement data to detect a macro handover event to a target macro base station, and in response, determine if the target macro base station supports the enhanced RF service, and if the target macro base station supports the enhanced RF service, then modify the hysteresis parameter to drive the macro handover to the target macro base station.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
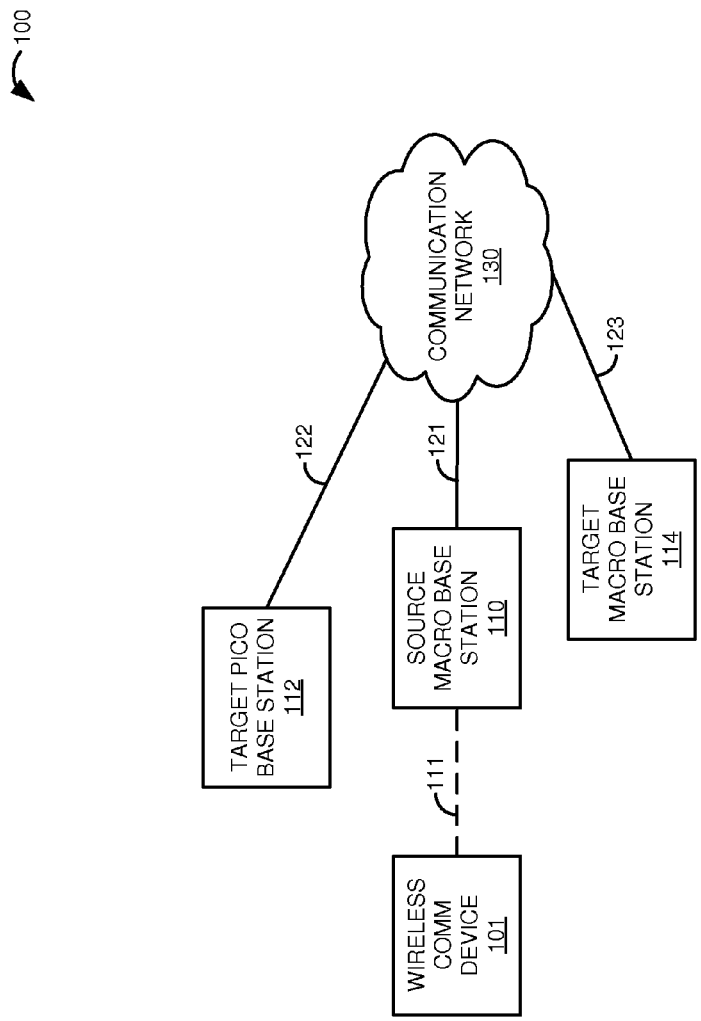
FIG. 1 is a block diagram that illustrates a communication system.

FIG. 1 is a block diagram that illustrates communication system 100. Communication system 100 includes wireless communication device 101, source macro base station 110, target pico base station 112, target macro base station 114, and communication network 130. Wireless communication device 101 and source macro base station 110 are in communication over wireless communication link 111. Source macro base station 110 and communication network 130 communicate over communication link 121. Likewise, target pico base station 112 and communication network 130 are in communication over communication link 122. Target macro base station 114 and communication network 130 communicate over communication link 123.

Figure 2:
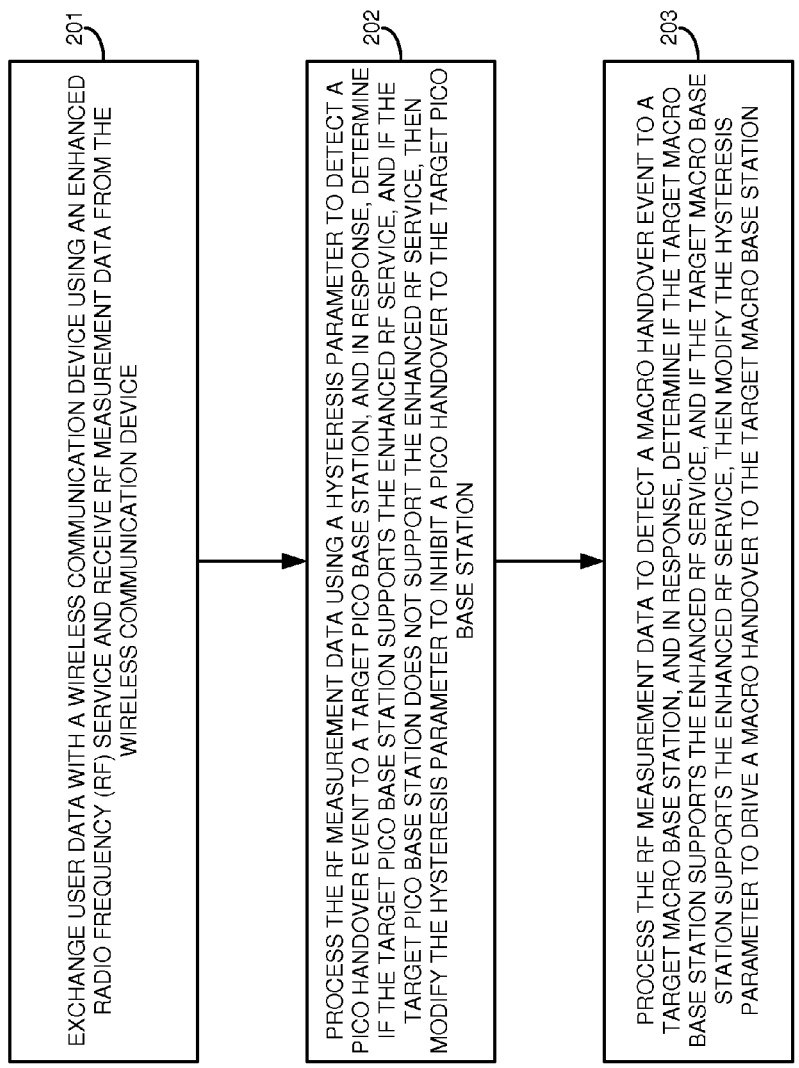
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by source macro base station 110 to perform a macro handover of wireless communication device 101.

As shown in the operational flow of FIG. 2, source macro base station 110 exchanges user data with wireless communication device 101 using an enhanced Radio Frequency (RF) service and receives RF measurement data from wireless communication device 101 (201). The user data exchanged between source macro base station 110 and wireless communication device 101 could comprise any voice or data communications for wireless communication device 101, such as voice calls, streaming media, short message service (SMS) and multimedia message service (MMS) messages, email, web page content, file transfers, and the like. The user data is exchanged using an enhanced RF service. In some examples, the enhanced RF service could comprise carrier aggregation, beamforming, Voice over Long Term Evolution (VoLTE), video conferencing, video streaming, or any other communication service. Source macro base station 110 also receives RF measurement data from wireless communication device 101. Typically, wireless communication device 101 periodically conducts various RF status measurements, such as reference signal received power (RSRP), reference signal received quality (RSRQ), and other measurements from transmissions from neighboring base stations, such as base stations 110, 112, and 114. Wireless communication device 101 then transfers this RF measurement data for receipt by source macro base station 110.

Source macro base station 110 processes the RF measurement data using a hysteresis parameter to detect a pico handover event to target pico base station 112, and in response, determines if target pico base station 112 supports the enhanced RF service (202). The hysteresis parameter typically comprises a value that is added to the RSRP of the serving base station 110 for comparison to the RSRP of a potential target base station handover candidate, such as base stations 112 and 114. For example, the RF measurement data could indicate that wireless communication device 101 is observing improved RF measurements from target pico base station 112, which may ordinarily trigger a handover to pico base station 112. Therefore, in some examples, source macro base station 110 could detect the pico handover event to target pico base station 112 by detecting that target pico base station 112 is a potential handover candidate for wireless communication device 101.

In response to detecting this pico handover event, source macro base station 110 determines if target pico base station 112 supports the enhanced RF service. For example, source macro base station 110 would determine whether or not target pico base station 112 supports carrier aggregation, beamforming, VoLTE, video conferencing, video streaming, or any other enhanced RF service that wireless communication device 101 is using to exchange user data with source macro base station 110—including combinations thereof. In some examples, source macro base station 110 could process the RF measurement data to detect the pico handover event and determine if target pico base station 112 supports the enhanced RF service by detecting a pico physical cell identity (PCI), a pico Public Land Mobile Network (PLMN) identifier, or some other identifier of target pico base station 112. Source macro base station 110 could then determine if the pico PCI, the pico PLMN, or any other identifier of pico base station 112 is associated with the enhanced RF service, such as by referencing a lookup table, for example.

If target pico base station 112 does not support the enhanced RF service, then source macro base station 110 modifies the hysteresis parameter to inhibit a pico handover to target pico base station 112 (202). Since the hysteresis parameter typically comprises a value that is added to the RSRP of the serving base station 110 for comparison to the RSRP of a target base station handover candidate, source macro base station 110 would typically increase the hysteresis parameter to inhibit the pico handover to target pico base station 112. In some implementations, source macro base station 110 could transmit the modified hysteresis parameter to wireless communication device 101 for use in its handover calculations, thereby ensuring that device 101 stays connected to macro base station 110 and does not request a handover to target pico base station 112.

Source macro base station 110 also processes the RF measurement data to detect a macro handover event to target macro base station 114, and in response, determines if target macro base station 114 supports the enhanced RF service (203). For example, as wireless communication device 101 moves closer to target macro base station 114, the RF measurement data could indicate that device 101 is observing improved RF measurements from target macro base station 114, which could lead to a handover to macro base station 114. Therefore, in some examples, source macro base station 110 could detect the macro handover event by detecting that target macro base station 114 is a potential handover candidate for wireless communication device 101.

In response to detecting the macro handover event, source macro base station 110 determines if target macro base station 114 supports the enhanced RF service. For example, source macro base station 110 could determine whether or not target macro base station 114 supports carrier aggregation, beamforming, VoLTE, video conferencing, video streaming, and/or any other enhanced RF service that wireless communication device 101 is using to exchange user data with source macro base station 110. In some examples, source macro base station 110 could process the RF measurement data to detect the macro handover event and determine if target macro base station 114 supports the enhanced RF service by detecting a macro physical cell identity (PCI), a macro Public Land Mobile Network (PLMN) identifier, or some other identifier of target macro base station 114. Source macro base station 110 could then determine if the macro PCI, the macro PLMN, or any other identifier of target macro base station 114 is associated with the enhanced RF service.

If target macro base station 114 supports the enhanced RF service, then source macro base station 110 modifies the hysteresis parameter to drive the macro handover to target macro base station 114 (203). Since the hysteresis parameter typically comprises a value that is added to the RSRP of the serving base station 110 for comparison to the RSRP of a target base station handover candidate, source macro base station 110 would typically decrease the hysteresis parameter to drive the macro handover to target macro base station 114. In some examples, source macro base station 110 could modify the hysteresis parameter to drive the macro handover to target macro base station 114 by setting the hysteresis parameter to a negative value. Source macro base station 110 may also transmit the modified hysteresis parameter to wireless communication device 101 in some implementations, thereby effectively forcing device 101 to perform the macro handover to target macro base station 114.

Advantageously, source macro base station 110 modifies a hysteresis parameter to inhibit a pico handover to target pico base station 112 if pico base station 112 does not support an enhanced RF service used by wireless communication device 101. In this manner, wireless communication device 101 will avoid handovers to pico base station 112 and remain connected to serving base station 110 longer so that device 101 may continue to utilize carrier aggregation or other enhanced RF features available on base station 110. Conversely, when wireless communication device 101 begins sending measurement reports on target macro base station 114, an early handover can be triggered by modifying the hysteresis parameter to drive a handover to target macro base station 114 if source macro base station 110 determines that target macro base station 114 supports the RF service. By setting a dynamic hysteresis value based on neighbor capability of one or more enhanced RF services, source macro base station 110 can facilitate higher data throughput and other benefits, resulting in an improved user experience.

Now referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Source macro base station 110 and target macro base station 114 each individually comprise RF communication circuitry and an antenna. The RF communication circuitry typically includes an amplifier, filter, RF modulator, and signal processing circuitry. Macro base stations 110 and 114 may also comprise a router, server, memory device, software, processing circuitry, cabling, power supply, network communication interface, structural support, or some other communication apparatus. Macro base stations 110 and 114 could each comprise a wireless access node, Internet access node, telephony service node, wireless data access point, or some other wireless communication system—including combinations thereof. Some examples of macro base stations 110 and 114 include a base transceiver station (BTS), base station controller (BSC), radio base station (RBS), Node B, enhanced Node B (eNodeB), and others—including combinations thereof. Wireless network protocols that may be utilized by macro base stations 110 and 114 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. In some examples, macro base stations 110 and 114 typically provide the widest range of cell sizes relative to other base stations, such as picocell base stations, microcell base stations, and femtocell base stations.

Target pico base station 112 comprises RF communication circuitry and an antenna. The RF communication circuitry typically includes an amplifier, filter, RF modulator, and signal processing circuitry. Pico base station 112 may also comprise a router, server, memory device, software, processing circuitry, cabling, power supply, network communication interface, structural support, or some other communication apparatus. Pico base station 112 could comprise a wireless access node, Internet access node, telephony service node, wireless data access point, or some other wireless communication system—including combinations thereof. Some examples of pico base station 112 include a base transceiver station (BTS), base station controller (BSC), radio base station (RBS), Node B, enhanced Node B (eNodeB), home-evolved Node B (HeNB), closed subscriber group (CSG) cell, relay node, and others—including combinations thereof. Wireless network protocols that may be utilized by pico base station 112 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Pico base station 112 typically provides a lesser range of wireless coverage than macro base stations 110 and 114. In some examples, pico base station 112 may provide a wireless coverage range of two hundred meters or less. However, in some examples pico base station 112 could comprise a microcell base station and/or a femtocell base station. Typically, a microcell base station may provide a wireless coverage range of roughly two kilometers, and a femtocell base station may provide a ten meter range of wireless coverage. Other coverage ranges of pico base station 112 are possible and within the scope of this disclosure.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 use the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 122, and 123 use metal, air, space, optical fiber such as glass or plastic, or some other material as the transport medium—including combinations thereof. Communication links 121-123 could use various communication protocols, such as TDM, IP, Ethernet, telephony, optical networking, hybrid fiber coax (HFC), communication signaling, wireless protocols, or some other communication format—including combinations thereof. Communication links 121-123 may be direct links or could include intermediate networks, systems, or devices.

Figure 3:
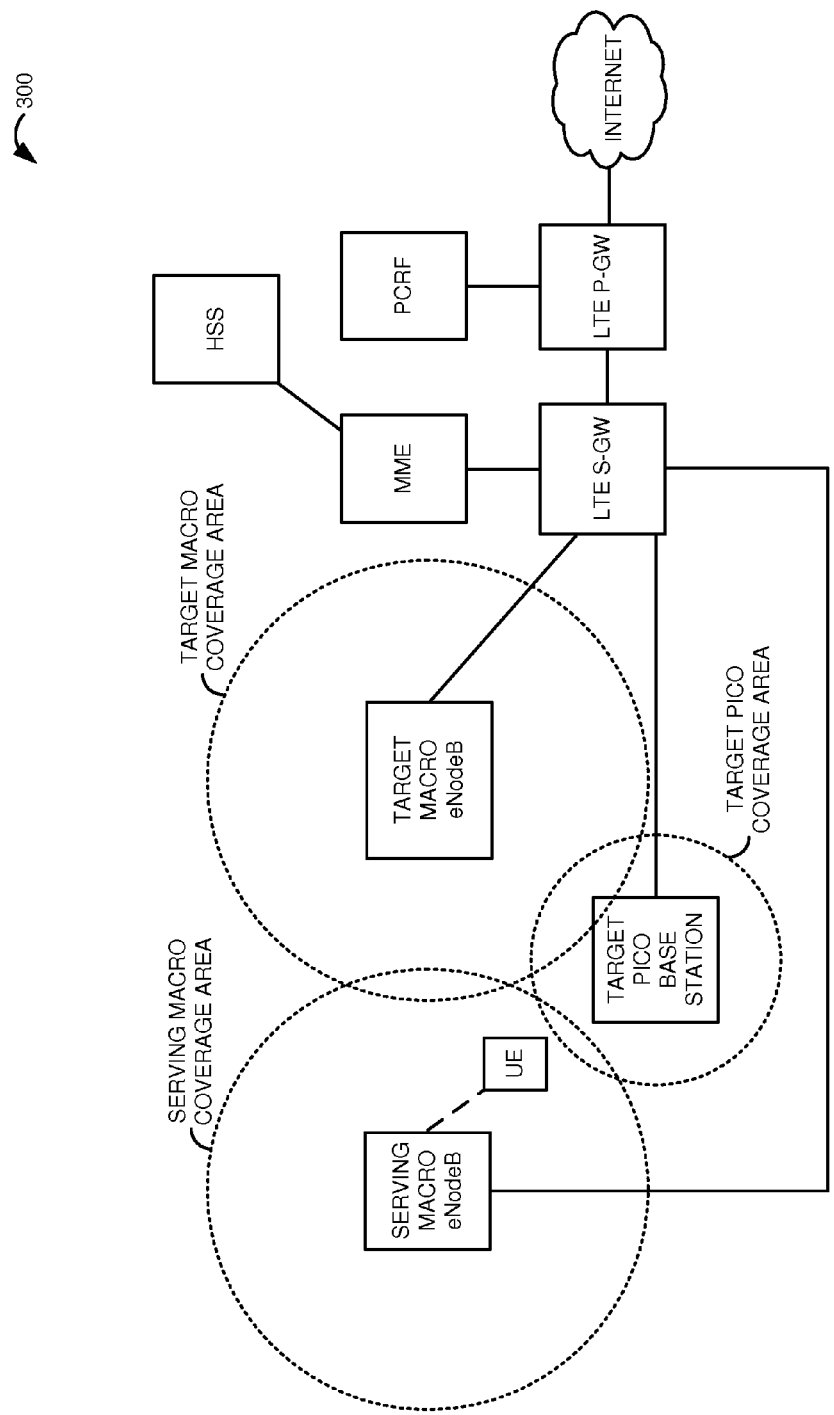
FIG. 3 is a block diagram that illustrates a communication system in an exemplary embodiment.

FIG. 3 is a block diagram that illustrates long term evolution (LTE) communication system 300 in an exemplary embodiment. In this example, LTE communication system 300 comprises an LTE Advanced heterogeneous network. LTE communication system 300 includes two enhanced Node B (eNodeB) macro base stations that are in communication with network elements of the LTE communication network. The eNodeB base stations provide examples of macro base stations 110 and 114, although base stations 110 and 114 may use alternative configurations. The LTE communication network in this example includes a mobility management entity (MME), serving gateway (S-GW), packet data network gateway (P-GW), home subscriber server (HSS), policy and charging rules function (PCRF), and other network elements typically found in a 4G LTE communication network that are not shown for clarity. LTE communication system 300 also includes a user equipment (UE) device. The UE provides an example of wireless communication device 101, although device 101 could use alternative configurations. In this example, the UE is in communication with a serving macro eNodeB, as shown by the dashed line representing their wireless communication link. The serving and target macro eNodeBs serve respective cells having wireless coverage areas with approximate boundaries as indicated by the dotted lines encircling them, designated as "serving macro coverage area" and "target macro coverage area" in FIG. 3, respectively, which are typically defined by the signal propagation characteristics and coverage capabilities of the eNodeBs. LTE communication system 300 also includes a target pico base station that has a wireless coverage area with approximate boundaries as indicated by the dotted line encircling it, designated as "target pico coverage area" in FIG. 3.

In operation, a user typically operates the UE to engage in an Internet data session via the LTE access network. As the UE moves throughout the communication network, the UE measures RSRP and RSRQ values from reference signals included in the resource blocks by the base stations. The UE periodically transfers these measurements to the serving eNodeB along with other information in a measurement report, typically using a radio resource control (RRC) Connection Reconfiguration message. Various events also trigger the UE to transfer these measurement reports. For example, the UE transfers a measurement report to inform the serving eNodeB when the UE observes that the RSRP of a target cell has risen to some offset higher than the primary cell, commonly referred to as an A3 event. A3 handover events are triggered based on the following equation: Target RSRP>Serving RSRP+A3 offset+A3 hysteresis. In this example, the UE is moving away from the serving macro eNodeB and towards the target pico base station and target macro eNodeB, triggering A3 handover events in the process. An operation of serving macro eNodeB to optimize the handover between these neighboring cells by dynamically manipulating the hysteresis value will now be discussed with respect to FIG. 4.

Figure 4:
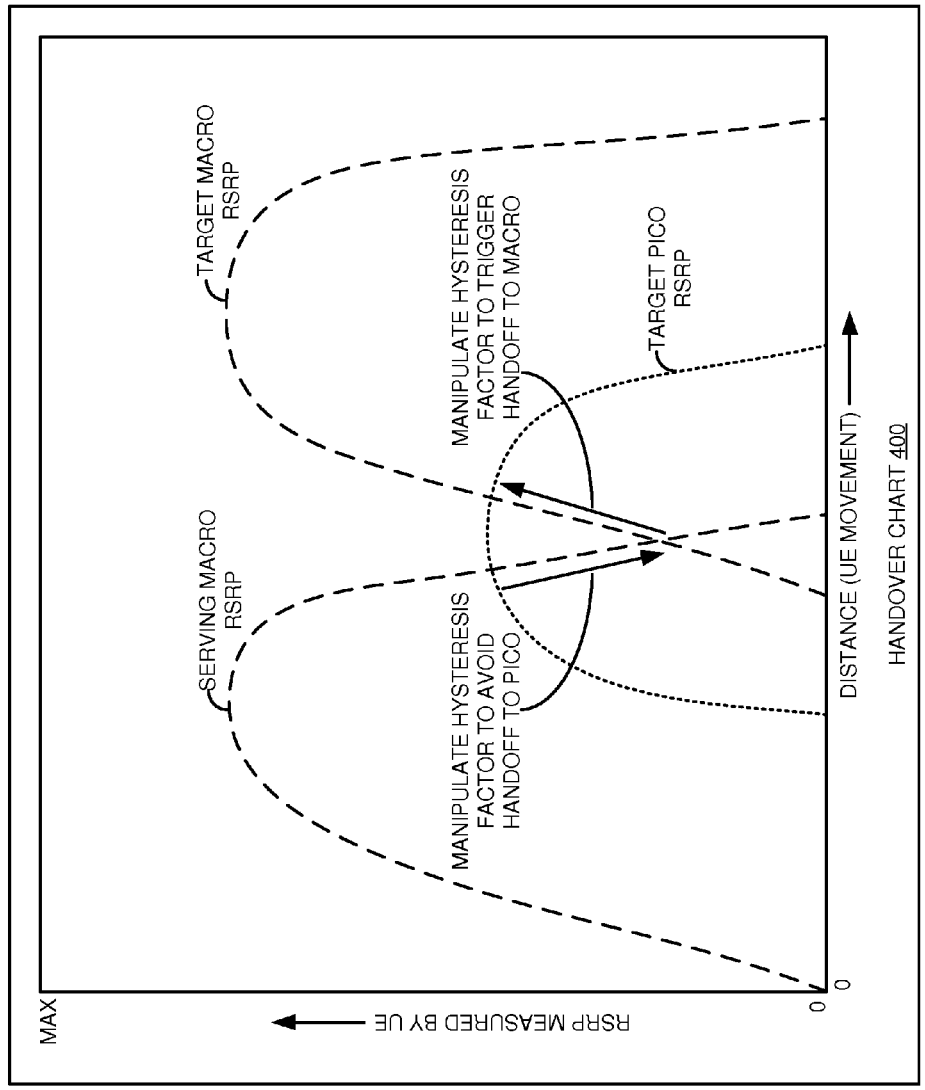
FIG. 4 is a chart diagram that illustrates an operation of a communication system in an exemplary embodiment.

FIG. 4 is a chart diagram that illustrates an operation of LTE communication system 300 in an exemplary embodiment. In FIG. 4, handover chart 400 maps the RSRP measurements observed by the UE as it moves throughout LTE communication system 300. The RSRP measurements of the various base stations are shown on the Y-axis of chart 400 while the distance of the UE relative to each of the base stations is shown along the X-axis. In this example, both the serving and the target macro eNodeB base stations support carrier aggregation, but the pico base station does not. The handover from the serving eNodeB can thus be optimized by avoiding the pico base station and handing off to the target macro eNodeB that supports carrier aggregation.

Initially, the UE is closest to the serving macro eNodeB and within the serving macro coverage area as illustrated in FIG. 3, so the serving macro RSRP appears highest in chart 400. However, as the UE moves away from the serving macro eNodeB and towards the pico base station, the serving macro RSRP begins to decline. As the UE approaches the pico base station, the UE measures RSRP values from the pico and includes them in a measurement report to the serving macro eNodeB pursuant to an A3 handover event. When the serving eNodeB sees the PCI, PLMN, or some other identifier of the pico base station appear as a target in the A3 event, the serving eNodeB determines whether or not the pico base station supports carrier aggregation. For example, the serving eNodeB could look up the identifier of the pico base station in a relational database to determine whether the pico base station has carrier aggregation capabilities.

In this case, the serving macro eNodeB determines that the pico base station does not support carrier aggregation, so a handover to the pico base station should be avoided. The serving macro eNodeB therefore manipulates the hysteresis factor to prevent the UE from handing off to the pico base station, even though the pico base station might be providing better coverage to the UE than the serving macro eNodeB at the time. To achieve this, the serving macro eNodeB could increase the A3 hysteresis factor so that the target RSRP of the pico base station is still less than the sum of the serving eNodeB RSRP, the A3 offset, and the modified A3 hysteresis factor. However, note that the A3 hysteresis factor should not be increased to a value greater than the A3 offset to avoid "ping pong" behavior. Due to the artificially increased hysteresis value, the UE will remain longer on the serving macro eNodeB and therefore achieve higher throughput by continuing to use the carrier aggregation capability of the macro eNodeB.

As the UE moves closer to the target macro eNodeB and starts sending measurement reports with RSRP values associated with the target macro eNodeB, the serving macro eNodeB confirms that the serving macro eNodeB supports carrier aggregation and can trigger an early handover to the target macro eNodeB in this case. For example, when the serving eNodeB sees the PCI of the target macro eNodeB appear as a target in an A3 handover event, the serving eNodeB determines whether or not the target eNodeB supports carrier aggregation. Since the target macro eNodeB does support carrier aggregation in this example, the serving macro eNodeB manipulates the hysteresis factor to trigger an earlier handover to the target macro eNodeB, even though the pico base station may still be providing better coverage to the UE than the target macro eNodeB at the time. To achieve this, the serving macro eNodeB could decrease the A3 hysteresis factor so that the RSRP of the target macro eNodeB is greater than the sum of the serving eNodeB RSRP, the A3 offset, and the modified A3 hysteresis factor. Due to the artificially decreased hysteresis value, the UE can avoid a handover to the pico base station and will handoff to the target macro eNodeB earlier than it would otherwise, therefore achieving higher throughput from the carrier aggregation capability of the target macro eNodeB for an improved user experience.

Figure 5:
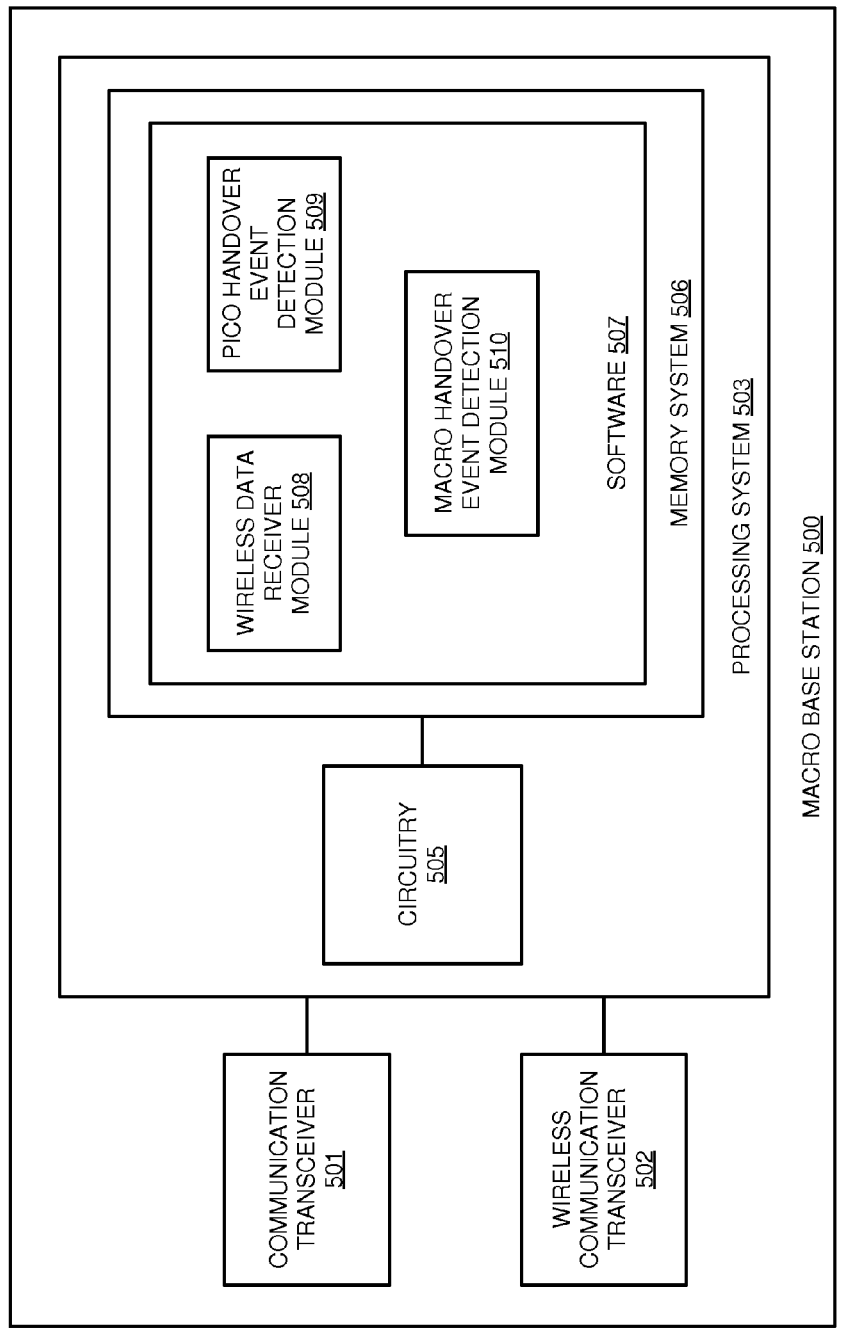
FIG. 5 is a block diagram that illustrates a macro base station.

FIG. 5 is a block diagram that illustrates macro base station 500. Macro base station 500 provides an example of source macro base station 110, although base station 110 may have alternative configurations. Macro base station 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-510.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 502 may be configured to exchange user data with a wireless communication device using an enhanced Radio Frequency (RF) service and receive RF measurement data from the wireless communication device.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-510, although software 507 could have alternative configurations in other examples.

When executed by circuitry 505, operating software 507 directs processing system 503 to operate as described herein for source macro base station 110. In particular, operating software 507 may direct processing system 503 to direct wireless communication transceiver 502 to exchange user data with a wireless communication device using an enhanced Radio Frequency (RF) service and receive RF measurement data from the wireless communication device. Operating software 507 further directs processing system 503 to process the RF measurement data using a hysteresis parameter to detect a pico handover event to a target pico base station, and in response, determine if the target pico base station supports the enhanced RF service, and if the target pico base station does not support the enhanced RF service, then modify the hysteresis parameter to inhibit a pico handover to the target pico base station. In addition, operating software 507 directs processing system 503 to process the RF measurement data to detect a macro handover event to a target macro base station, and in response, determine if the target macro base station supports the enhanced RF service, and if the target macro base station supports the enhanced RF service, then modify the hysteresis parameter to drive the macro handover to the target macro base station.

In this example, operating software 507 comprises a wireless data receiver software module 508 that exchanges user data with a wireless communication device using an enhanced Radio Frequency (RF) service and receive RF measurement data from the wireless communication device. Operating software 507 also comprises a pico handover event detection software module 509 that to processes the RF measurement data using a hysteresis parameter to detect a pico handover event to a target pico base station, and in response, determines if the target pico base station supports the enhanced RF service, and if the target pico base station does not support the enhanced RF service, then modifies the hysteresis parameter to inhibit a pico handover to the target pico base station. Operating software 507 further comprises macro handover event detection software module 510 that processes the RF measurement data to detect a macro handover event to a target macro base station, and in response, determines if the target macro base station supports the enhanced RF service, and if the target macro base station supports the enhanced RF service, then modifies the hysteresis parameter to drive the macro handover to the target macro base station.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a source macro base station to perform a macro handover of a wireless communication device, the method comprising:
    exchanging user data with the wireless communication device using an enhanced Radio Frequency (RF) service and receiving RF measurement data from the wireless communication device;
    processing the RF measurement data using a hysteresis parameter to detect a pico handover event to a target pico base station, and in response, determining if the target pico base station supports the enhanced RF service, and if the target pico base station does not support the enhanced RF service, then modifying the hysteresis parameter to inhibit a pico handover to the target pico base station; and
    processing the RF measurement data to detect a macro handover event to a target macro base station, and in response, determining if the target macro base station supports the enhanced RF service, and if the target macro base station supports the enhanced RF service, then modifying the hysteresis parameter to drive the macro handover to the target macro base station.

2. The method of claim 1 wherein the enhanced RF service comprises carrier aggregation.

3. The method of claim 1 wherein the enhanced RF service comprises beamforming.

4. The method of claim 1 wherein the enhanced RF service comprises Voice over Long Term Evolution (VoLTE).

5. The method of claim 1 wherein the enhanced RF service comprises video conferencing.

6. The method of claim 1 wherein the enhanced RF service comprises video streaming.

7. The method of claim 1 wherein processing the RF measurement data to detect the pico handover event and determining if the target pico base station supports the enhanced RF service comprises detecting a pico physical cell identity (PCI) of the target pico base station and determining if the pico PCI is associated with the enhanced RF service.

8. The method of claim 1 wherein processing the RF measurement data to detect the pico handover event and determining if the target pico base station supports the enhanced RF service comprises detecting a pico Public Land Mobile Network (PLMN) of the target pico base station and determining if the pico PLMN is associated with the enhanced RF service.

9. The method of claim 1 wherein processing the RF measurement data to detect the macro handover event and determining if the target macro base station supports the enhanced RF service comprises detecting a macro physical cell identity (PCI) of the target macro base station and determining if the macro PCI is associated with the enhanced RF service.

10. The method of claim 1 wherein processing the RF measurement data to detect the macro handover event and determining if the target macro base station supports the enhanced RF service comprises detecting a macro Public Land Mobile Network (PLMN) of the target macro base station and determining if the macro PLMN is associated with the enhanced RF service.

11. A source macro base station to perform a macro handover of a wireless communication device, the source macro base station comprising:
    a wireless communication transceiver configured to exchange user data with the wireless communication device using an enhanced Radio Frequency (RF) service and receive RF measurement data from the wireless communication device; and
    a processing system configured to process the RF measurement data using a hysteresis parameter to detect a pico handover event to a target pico base station, and in response, determine if the target pico base station supports the enhanced RF service, and if the target pico base station does not support the enhanced RF service, then modify the hysteresis parameter to inhibit a pico handover to the target pico base station;
    the processing system further configured to process the RF measurement data to detect a macro handover event to a target macro base station, and in response, determine if the target macro base station supports the enhanced RF service, and if the target macro base station supports the enhanced RF service, then modify the hysteresis parameter to drive the macro handover to the target macro base station.

12. The source macro base station of claim 11 wherein the enhanced RF service comprises carrier aggregation.

13. The source macro base station of claim 11 wherein the enhanced RF service comprises beamforming.

14. The source macro base station of claim 11 wherein the enhanced RF service comprises Voice over Long Term Evolution (VoLTE).

15. The source macro base station of claim 11 wherein the enhanced RF service comprises video conferencing.

16. The source macro base station of claim 11 wherein the enhanced RF service comprises video streaming.

17. The source macro base station of claim 11 wherein the processing system configured to process the RF measurement data to detect the pico handover event and determine if the target pico base station supports the enhanced RF service comprises the processing system configured to detect a pico physical cell identity (PCI) of the target pico base station and determine if the pico PCI is associated with the enhanced RF service.

18. The source macro base station of claim 11 wherein the processing system configured to process the RF measurement data to detect the pico handover event and determine if the target pico base station supports the enhanced RF service comprises the processing system configured to detect a pico Public Land Mobile Network (PLMN) of the target pico base station and determine if the pico PLMN is associated with the enhanced RF service.

19. The source macro base station of claim 11 wherein the processing system configured to process the RF measurement data to detect the macro handover event and determine if the target macro base station supports the enhanced RF service comprises the processing system configured to detect a macro physical cell identity (PCI) of the target macro base station and determine if the macro PCI is associated with the enhanced RF service.

20. A computer apparatus to operate a source macro base station to perform a macro handover of a wireless communication device, the apparatus comprising:

software instructions configured, when executed by the source macro base station, to direct the source macro base station to exchange user data with the wireless communication device using an enhanced Radio Frequency (RF) service and receive RF measurement data from the wireless communication device, process the RF measurement data using a hysteresis parameter to detect a pico handover event to a target pico base station, and in response, determine if the target pico base station supports the enhanced RF service, and if the target pico base station does not support the enhanced RF service, then modify the hysteresis parameter to inhibit a pico handover to the target pico base station;

the software instructions further configured to direct the source macro base station to process the RF measurement data to detect a macro handover event to a target macro base station, and in response, determine if the target macro base station supports the enhanced RF service, and if the target macro base station supports the enhanced RF service, then modify the hysteresis parameter to drive the macro handover to the target macro base station; and at least one non-transitory computer-readable storage medium storing the software instructions.

* * * * *